United States Patent [19]

Spanier

[11] 4,195,934
[45] Apr. 1, 1980

[54] PLASTICIZING CYLINDER FOR A PLASTICS MOULDING MACHINE

[75] Inventor: Hermann Spanier, Windhagen, Fed. Rep. of Germany

[73] Assignee: Dr. Boy G.m.b.H., Fernthal, Fed. Rep. of Germany

[21] Appl. No.: 20,744

[22] Filed: Mar. 15, 1979

[30] Foreign Application Priority Data

Mar. 17, 1978 [DE] Fed. Rep. of Germany ....... 7808169

[51] Int. Cl.² .............................................. B28C 7/14
[52] U.S. Cl. ..................................... 366/76; 222/325; 425/192 R
[58] Field of Search ...................... 366/76, 77, 79, 75, 366/150, 182, 183, 68; 100/188, 145, 146, 147, 148, 149, 150; 222/325, 185; 425/192 R

[56] References Cited

U.S. PATENT DOCUMENTS

| | | | |
|---|---|---|---|
| 3,738,618 | 6/1973 | Hehl | 366/79 |
| 3,811,658 | 5/1974 | Heidrich | 366/76 |
| 3,865,355 | 2/1975 | Claire | 366/76 |
| 3,985,348 | 10/1976 | Skidmore | 366/76 |

Primary Examiner—Robert W. Jenkins
Attorney, Agent, or Firm—Pennie & Edmonds

[57] ABSTRACT

The invention relates to the combination of a plasticizing cylinder having a mounting surface with a feed hopper. The cylinder carries two pegs accommodated in corresponding recesses in the hopper. A threaded bolt is provided which is screwed through a portion of the cylinder and engages a surface on the hopper and exerts a force having a component along the mounting surface. The pegs are inclined to the mounting surface so that they exert on the hopper a force having a component towards the mounting surface.

5 Claims, 4 Drawing Figures

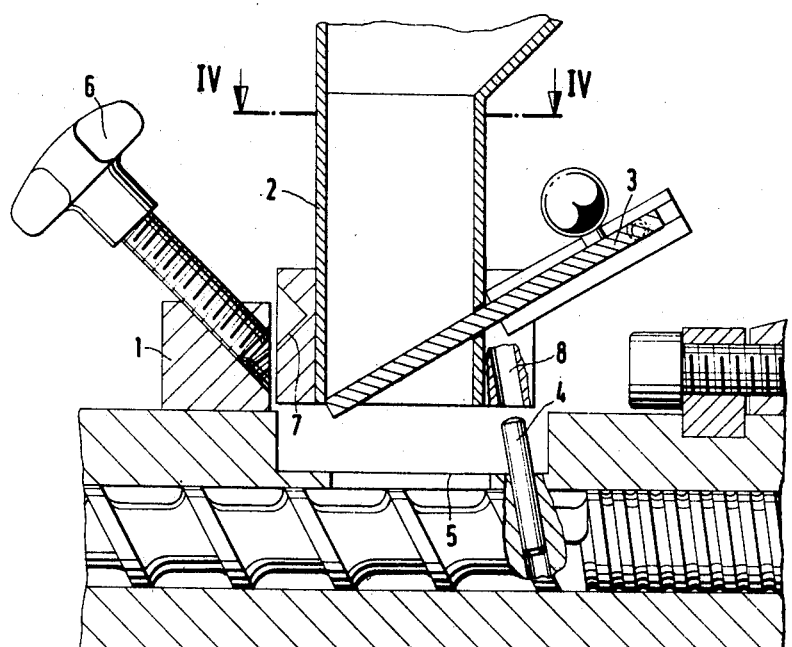
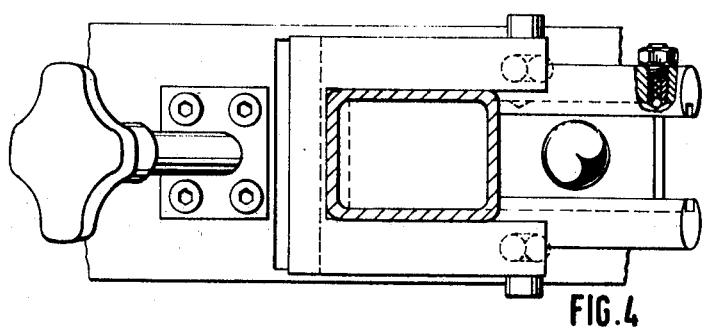

PLASTICIZING CYLINDER FOR A PLASTICS MOULDING MACHINE

The invention relates to a combination of a plasticising cylinder for a plastics moulding machine with a feed hopper, and is particularly concerning with the securing of a feed hopper to such a plasticising cylinder.

In the past, hoppers have commonly been secured to their plasticising cylinder by means of threaded bolts projecting from the cylinder. Such an arrangement is relatively labour and time-consuming if a change of material or colour is to be made, since the hopper has to be removed and cleaned or replaced by another hopper.

It is also known to mount the hopper on a swivel arm and to use this arm to clamp the hopper against the plasticising cylinder. The work involved in assembling and dismantling the hopper for this is also considerable. In addition, the construction of the swivel arm is expensive.

It is an object of the invention to provide a simple means to enable rapid fastening of a hopper to a plasticising cylinder.

In accordance with the present invention there is provided a combination of a plasticising cylinder for a plastics moulding machine with a feed hopper, the cylinder having a mounting surface for engagement with the hopper, in which the cylinder and the hopper carry a cooperating recess and projection and the hopper is fastened to the cylinder by means of a fastening device which exerts a force having a component along the mounting surface, the projection being obliquely inclined to the mounting surface so that it exerts on the hopper a force having a component towards the mounting surface.

Thus the hopper may be clamped in the manner of a wedge between the mounting surface and the projection which is at an acute angle to the mounting surface. The projection produces a pressure forcing the hopper against the mounting surface without it being necessary to introduce any external force at this location. Thus it is sufficient for the fastening device to engage the hopper at another location. Therefore the construction of the fastening device can be of simple design and the device can be constructed in such a way that it can be operated very simply in order either to release or lock the hopper.

Preferably the fastening means includes a bolt, e.g. a wing-headed bolt, inclined to the mounting surface and adapted to be screwed into a portion of the plasticising cylinder and to press against a surface on the hopper, which surface is conveniently at right angles to the axis of the bolt. By unscrewing the bolt the hopper can be simply removed or put in position.

In a preferred construction two projections or pegs are used with a single bolt between them. These are preferably arranged in the form of an isoceles triangle and results in the hopper exerting an even pressure on the cylinder and enables the hopper to be released or locked in a single operation.

Further features and details of the invention will be apparent from the following description of one specific embodiment which is given by way of example only with reference to the accompanying drawings, in which:

FIG. 3 is a view similar to that of FIG. 1, but in a semi-assembled state;

FIG. 4 is a sectional view on the line IV—IV in FIG. 3.

Figure 1:
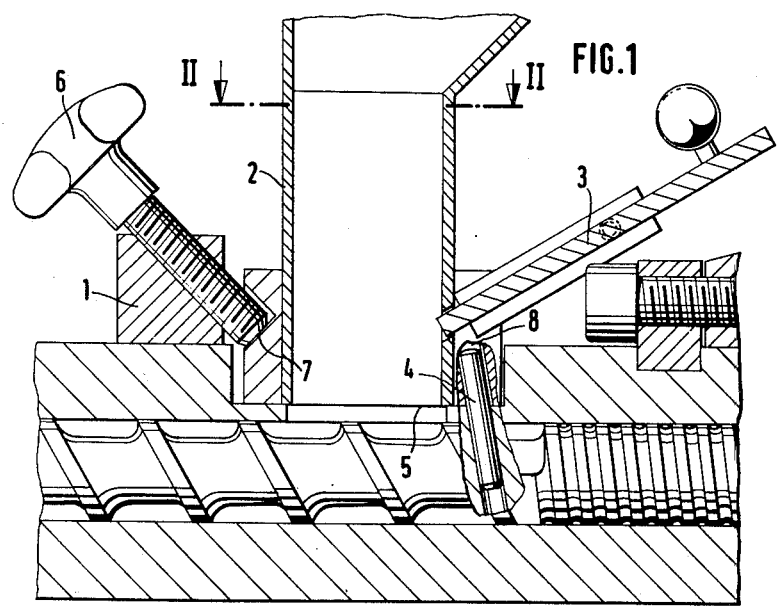
FIG. 1 is a sectional elevation of a device according to the invention.

FIG. 1 shows a plasticising cylinder 1 on which a feed hopper 2 is mounted. The hopper has a slide 3 which serves as a closure and in the operating position shown is withdrawn, so as to permit plastics material to enter the plasticising cylinder.

The hopper is located on the plasticising cylinder 1 by means of two projections or pegs 4 projecting from the cylinder 1 and received in corresponding recesses formed in the base of the hopper. The two pegs are spaced apart at one end and on opposite sides of a hole formed in the cylinder wall through which the interior of the hopper communicates with the interior of the cylinder. At the other end of the hole in the cylinder there is a mounting surface 5 engaged by the base of the hopper. As may be seen in FIGS. 1 and 2, the two pegs 4 are parallel to one another and inclined slightly towards the mounting surfaces.

There is also provided a fastening device comprising a wing-headed bolt 6 which is screwed through a block projecting up from the surface of the cylinder and presses against a surface 7 on the hopper base lying perpendicular to the axis of the bolt. When tightened the bolt exerts a force on the hopper which is inclined to both the mounting surface 5 and the surfaces of the pegs 4. The hopper is therefore held firmly against the cylinder at its left side, as seen in FIG. 1, by the downward component of the force exerted by the bolt and at its right side by the downward component of the reaction of the pegs to the horizontal component of the force exerted by the bolt.

Figure 2:
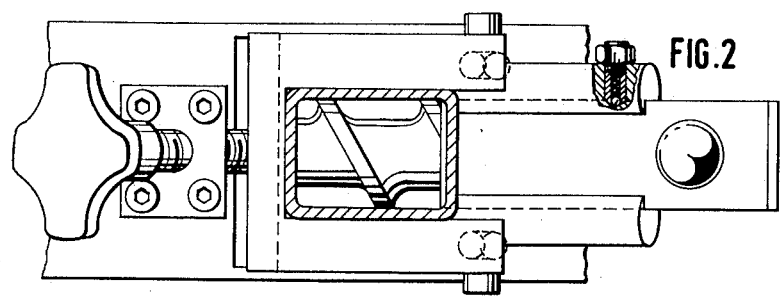
FIG. 2 is a sectional view on the line II—II in FIG. 1.

As shown in FIG. 2 the two pegs 4 and the bolt 6 are arranged in the form of an isosceles triangle around the hole in the cylinder, i.e. around the axis of the hopper.

FIGS. 3 and 4 show the arrangement of FIGS. 1 and 2 in a semi-assembled state. The slide 3 is therefore closed. In addition the bolt 6 is not in engagement with the associated surface 7 on the hopper and is unscrewed sufficiently that it does not hinder the withdrawal or mounting of the hopper. The hopper is shown in a raised position in which the pegs 4 are not engaged in their respective recesses on the funnel.

What I claim as my invention and desire to secure by Letters Patent is:

1. A combination of a plasticising cylinder for a plastics moulding machine with a feed hopper, said cylinder having a mounting surface for engagement with said hopper, wherein said cylinder and said hopper carry cooperating projection and recess means and said combination further includes fastening means fastening said hopper to said cylinder, said fastening means being constructed and arranged to exert a force on said hopper along said mounting surface and said projection means being obliquely inclined to said mounting surface so that it exerts on said hopper a force having a component towards said mounting surface.

2. A combination according to claim 1 wherein said cylinder carries said projection means and said hopper affords said recess means.

3. A combination according to claim 2 wherein said cylinder carries two projections extending parallel to one another and said hopper affords two corresponding recesses.

4. A combination according to any one of claims 1 to 3 wherein said hopper affords an engagement surface and said fastening means comprises a threaded bolt inclined to said mounting surface and pressing against said engagement surface on said hopper.

5. A combination according to claim 3 wherein said two projections and said fastening means are arranged in the form of an isoceles triangle.

* * * * *